(12) United States Patent
Hidaka et al.

(10) Patent No.: US 6,510,363 B1
(45) Date of Patent: Jan. 21, 2003

(54) SURFACE TEXTURE MEASURING APPARATUS

(75) Inventors: Hiroyuki Hidaka, Miyazaki (JP); Toshihiro Kanematsu, Miyazaki (JP); Hiroomi Honda, Miyazaki (JP); Hideki Mishima, Miyazaki (JP); Takao Ishitoya, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/549,613

(22) Filed: Apr. 14, 2000

(30) Foreign Application Priority Data

Apr. 27, 1999 (JP) .............................................. 11-120748

(51) Int. Cl.⁷ .......................... G06F 19/00; G01B 5/28; G01B 11/24; G01F 17/00; G01F 23/00; G01F 19/00
(52) U.S. Cl. .......................... 700/195; 700/187; 702/56; 702/168; 73/105
(58) Field of Search ................................ 700/160, 168, 700/169, 187, 174–176, 179, 195, 280, 302, 303; 702/56, 167, 168, 97, 105; 73/104, 105; 33/556, 557

(56) References Cited

U.S. PATENT DOCUMENTS

| | | | | |
|---|---|---|---|---|
| 4,562,392 A | * | 12/1985 | Davis et al. ................. | 318/572 |
| 5,187,669 A | | 2/1993 | Wildes et al. ................ | 700/175 |
| 5,579,246 A | * | 11/1996 | Ebersbach et al. ............ | 702/95 |
| 5,773,824 A | * | 6/1998 | Flecha et al. ................ | 250/306 |
| 6,215,225 B1 | * | 4/2001 | Ishikawa et al. ............. | 310/319 |

* cited by examiner

*Primary Examiner*—Leo Picard
*Assistant Examiner*—Ryan Jarrett
(74) *Attorney, Agent, or Firm*—Oliff & Berridge, PLC

(57) ABSTRACT

A surface texture measuring apparatus allowing effects of vibration disturbance to be removed and a highly accurate measurement to be achieved. The surface texture measuring apparatus is further provided with a small surface texture measuring apparatus, which detects the amount of vibration of a workpiece while maintaining a detecting device in contact with the surface of the workpiece without moving the device along the workpiece. The main surface texture measuring apparatus conducts measurement with a high accuracy based on the detected unevenness value of the surface of the workpiece and on the amount of vibration detected by the small surface texture measuring apparatus.

10 Claims, 4 Drawing Sheets

SURFACE TEXTURE MEASURING APPARATUS

BACKGROUND OF THE INVENTION

1. Field of the Invention

The present invention relates to a surface texture measuring apparatus, and more particularly to such an apparatus capable of coping with vibration during measurement.

2. Description of the Related Art

Surface texture measuring apparatuses are commonly known that scan a surface of a measured object (workpiece) with a detector having a stylus to measure unevenness (or roughness) of the surface.

In such a surface texture measuring apparatus, the stylus is moved in a fixed direction (direction of the X axis), and displacement of the stylus in the vertical direction (direction of the Z axis) caused by unevenness of the workpiece is converted to electric signals, which are sampled by a scale signal or a fixed time signal, so that the unevenness (roughness, winding, shape, or the like) is analyzed as a function of the traveled distance (in the X axis direction) and displayed on a display device or printed by a printing device.

In surface texture measurement of a workpiece, unevenness smaller than a few $\mu$m is generally detected, and therefore even a very minute vibration adversely affects measurement data as disturbance.

Although a workpiece may be placed on a vibration-proof table to avoid such vibration, this is not always effective enough for measurement of a very small unevenness, and therefore reliability of measurement data becomes a problem. More specifically, vibration disturbance is caused by a person walking in a measurement room, and has adverse effects on data obtained during highly sensitive measurement even if the vibration-proof table is used, and therefore considerable care must be exercised, even when walking.

In addition, deformation caused by a worn-out reduction gear or a motor contained in the measurement apparatus itself may be a vibration source.

SUMMARY OF THE INVENTION

An object of the present invention is to provide a measuring apparatus that allows surface texture of a workpiece to be measured with a high accuracy even when vibration disturbance is generated during measurement.

In order to achieve the above object, the measuring apparatus of the present invention relates to a surface texture measuring apparatus for moving a stylus in a first axis direction along a workpiece to detect displacement of the stylus in a second axis direction perpendicular to the first axis direction resulting from surface texture of the workpiece, including detection means for detecting vibration of the workpiece, and output means for outputting the detected vibration in association with the movement of the stylus in the first axis direction. By detecting vibration of the workpiece, correction can be made to remove vibration components included in the displacement of the stylus in the second axis direction. The correction for removing the vibration can be made by the surface texture measuring apparatus. Alternatively, the surface texture measuring apparatus may output measurement data, i.e. displacement data accompanied with the movement in the first direction and vibration data, to an external device, which eliminates vibration components.

The detection means for detecting vibration preferably includes a second stylus, and means for bringing the second stylus into contact with the surface of the workpiece to detect displacement of the second stylus in the second axis direction at a contact position. A second surface texture measuring apparatus having the second stylus can be used for such a detecting unit.

More specifically, although the second surface texture measuring apparatus has a function of common surface texture measuring apparatuses, namely, a function of moving the second stylus along the workpiece and detecting displacement of the stylus in the second axis direction resulting from surface texture of the workpiece, the second surface texture measuring apparatus of the present invention does not move the second stylus along the workpiece, but detects the displacement of the second stylus in the second axis direction as the vibration.

Preferably, the detection means for detecting vibration includes means for outputting a signal synchronized with a timing for detecting the displacement of the stylus in the second axis direction accompanied with movement in the first axis direction. By using the signal synchronized with the timing for detecting surface texture of the workpiece as a sampling signal to detect the vibration, vibration can be detected in synchronization with measurement of the surface texture of the workpiece.

When the second surface texture measuring apparatus is used as the detection means for detecting vibration, the second surface texture measuring apparatus preferably includes means for receiving a signal synchronized with a timing for detecting displacement of the stylus in the second axis direction, and means for detecting the vibration by using the synchronized signal as a sampling signal. Thus, vibration can be detected in synchronization with measurement of the surface texture of the workpiece.

A surface texture measuring apparatus of the present invention includes means for stopping the stylus at the surface of the workpiece, means for detecting displacement of the stylus in the second direction in a stopped state as vibration of the workpiece, and means for outputting the vibration and displacement in a moving state. No separate vibration sensor is provided to the surface texture measuring apparatus, but instead the surface texture measuring apparatus itself serves as a vibration sensor. More specifically, the stylus is stopped at the surface of the workpiece without moving in the first axis direction, and displacement in the second axis direction is detected in the stopped state. This displacement is caused by vibration of the workpiece, not by the surface texture thereof. Considering that this vibration is also generated in the state where the stylus is moving at the workpiece surface in the first axis direction, vibration components can be removed from the measurement data of the surface texture of the workpiece.

A surface texture measuring apparatus of the present invention includes means for switching states where the stylus is moving in the first axis direction and is stopped, means for detecting displacement of the stylus in the second axis direction in the state where the stylus is stopped, means for detecting displacement of the stylus in the second axis direction in the state where the stylus is moving, and means for outputting the above two displacements. Surface texture measurement and vibration measurement are alternately conducted by switching the moving state and the stopped state. Consequently, the amount of vibration at the time surface texture of the workpiece is being measured can be detected with a high accuracy.

DESCRIPTION OF THE PREFERRED EMBODIMENTS

Preferred embodiments of the present invention will next be described with reference to the drawings.

Figure 1:
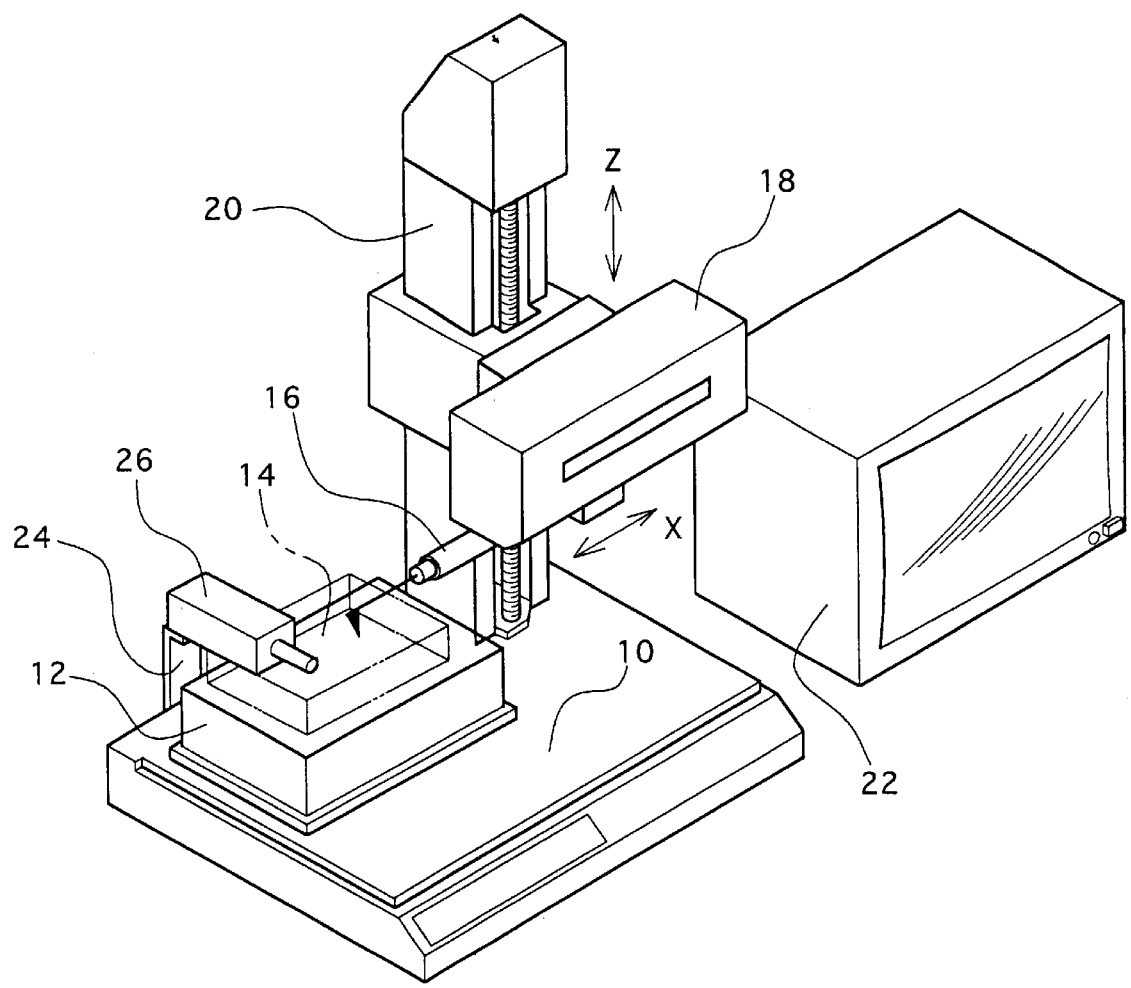
FIG. 1 is a view illustrating external appearance and structure of an apparatus according to an embodiment of the present invention.

FIG. 1 shows the external appearance and structure of an apparatus according to the present embodiment. On a base platform 10 a mounting table 12 is mounted, on which a workpiece 14 is fixed. The base platform 10 and the mounting table 12 are of a vibration-proof structure. A detecting device 16 having a stylus is provided on the base platform 10 by way of a driving device 18 and a strut 20. The detecting device 16 is driven by the driving device 18 in the directions indicated as X and Z in the figure. The tip of the stylus is brought into contact with a surface of the workpiece 14 by driving the device 16 in the Z direction, and unevenness of the surface of the workpiece 14 is detected while moving the device 16 in the X direction. The detected amount of unevenness is converted to electric signals, supplied to a display device 22, such as a computer display or the like, and displayed thereon.

When a computer display is used for the display device 22, a control device of the computer can control and drive the driving device 18 through a communication device, and detection signals from the detecting device 16 can be processed and displayed on the display device 22. The surface texture measuring apparatus comprising the base platform 10, the mounting table 12, the detecting device 16, the driving device 18, the strut 20, and the display device 22 (or the computer provided with an arithmetic operation unit) will be hereinafter referred to as a main measuring apparatus.

A strut 24 is disposed upright from the base platform 10, and provided with a small surface texture measuring apparatus 26 (hereinafter referred to as a small measuring apparatus 26). The small measuring apparatus 26 serves as a microvibrograph, detecting a small vibration applied to the workpiece 14, and supplying it to the main measuring apparatus. The main measuring apparatus receives input of the small vibration, and removes a vibration signal from a detected unevenness signal to obtain an unevenness signal without vibration components, thereby analyzing surface texture of the workpiece. While the small measuring apparatus 26 includes a detecting device with a stylus, a driving device, a data analyzing device, and the like, similarly to the main measuring apparatus, the stylus of the apparatus 26 (a second stylus) is not moved along the workpiece 14, and remains in contact with the surface of the workpiece 14. Since the stylus of the small measuring apparatus 26 is displaced by the vibration applied to the workpiece 14, the amount of vibration at the workpiece 14 can be detected with a high accuracy.

Figure 2:
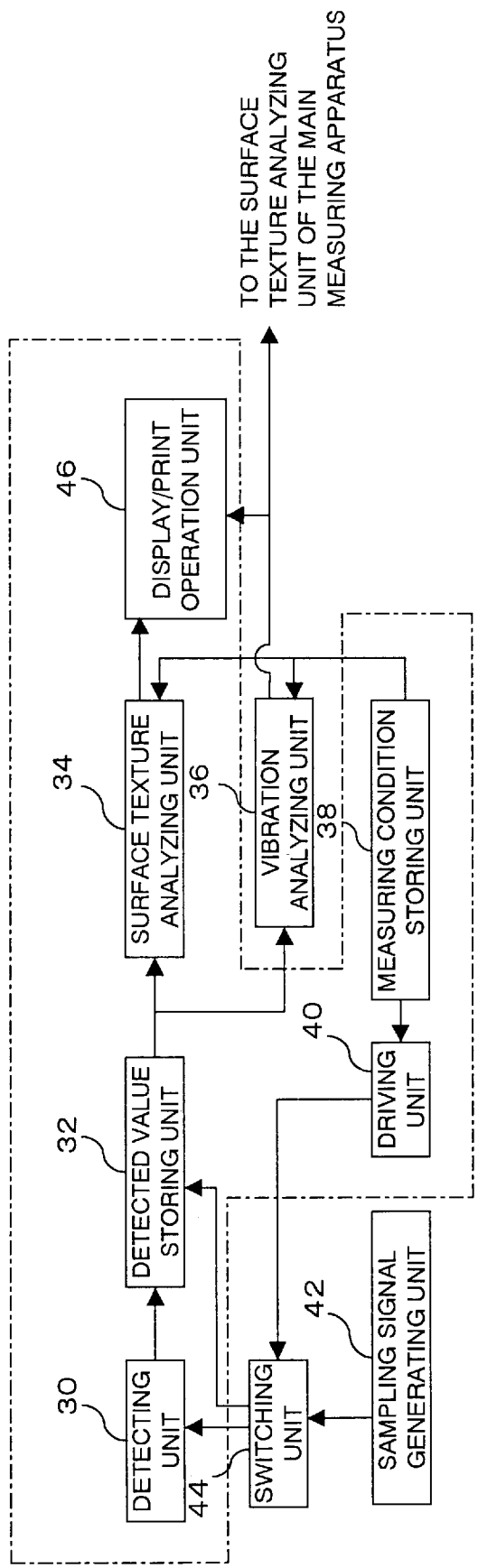
FIG. 2 is a block diagram illustrating a configuration of a small measuring apparatus shown in FIG. 1.

FIG. 2 is a block diagram illustrating a configuration of the small measuring apparatus 26 shown in FIG. 1. The small measuring apparatus serving as a vibrograph includes, as does the main measuring apparatus, a detecting unit 30, a detected value storing unit 32, a surface texture analyzing unit 34, a measuring condition storing unit 38, a driving unit 40, and a display/print operation unit 46. The small measuring apparatus further includes a sampling signal generating unit 42, a switching unit 44, and a vibration analyzing unit 36, which are not included in the main measuring apparatus. In FIG. 2, the components surrounded by a dot dash line are the components that both the main and small measuring apparatuses have. It should be noted that the surface texture analyzing unit of the main measuring apparatus receives vibration data from the vibration analyzing unit 36 of the small measuring apparatus 26, and performs correction processes, as discussed hereinafter.

The detecting unit 30 has a stylus, as does the detecting device 16, and converts displacement in the Z axis direction into electric signals, which are supplied to the detected value storing unit 32.

The detected value storing unit 32 stores and supplies the detected amount of displacement to the surface texture analyzing unit 34. Upon analyzing vibration, the unit 32 supplies the detected amount of displacement (amount of vibration) to the vibration analyzing unit 36. The unit to which the unit 32 supplies the data is determined in accordance with a switch signal applied from the switching unit 44 described hereinafter.

The surface texture analyzing unit 34 calculates roughness, winding, shape, and the like, based on the detected value, and outputs the data to the display/print operation unit 46. Conditions of the analysis are determined by parameters stored in the measurement condition storing unit 38, and these parameters can be set as desired by a user.

The vibration analyzing unit 36 processes the detected value supplied from the detected value storing unit 32, detects the amount of vibration as a function of measurement time at the main measuring apparatus, and outputs the detected amount to the display/print operation unit 46. When the driving device 18 drives the detecting device 16 at a fixed speed in the main measuring apparatus, the position of the detecting device 16 in the X axis direction can be uniquely identified by specifying measurement time (time elapsed since the measurement is initiated). Therefore, the amount of unevenness obtained by the main measuring apparatus and the amount of vibration obtained by the small measuring apparatus 26 can be synchronized with each other by detecting the amount of vibration as a function of time. The amount of vibration obtained by the vibration analyzing unit 36 is supplied to the surface texture analyzing unit of the main measuring apparatus. The surface texture analyzing unit of the main measuring apparatus corrects the amount of unevenness using the supplied amount of vibration, i.e. removes the vibration amount from the detected amount of unevenness, to detect an accurate amount of unevenness at the surface of the workpiece.

The driving unit 40 intrinsically produces and supplies a driving signal for moving the detecting unit 30 along the surface of the workpiece 14, similarly to that of the main measuring apparatus. However, in the small measuring apparatus 26, the driving signal is supplied to the switching unit 44.

The switching unit 44 switches the driving signal from the driving unit 40 and the sampling signal from the sampling signal generating unit 42, and outputs the signal to the detecting unit 30. More specifically, when the small measuring apparatus 26 is to serve as a common surface texture measuring apparatus, the unit 44 supplies the driving signal from the driving unit 40 to the detecting unit 30, to cause the unit 30 to move along the surface of the workpiece 14 and the surface texture analyzing unit 34 to perform an analysis. On the other hand, when the small measuring apparatus 26 is to serve as a microvibrograph as shown in FIG. 1, the sampling signal from the sampling signal generating unit 42 is supplied to the detecting unit 30 to sample displacement in the Z axis direction caused by vibration of the workpiece 14 at a fixed position in the x axis direction, followed by detection of vibration amount by the vibration analyzing unit 36.

Thus, the small measuring apparatus 26 of the present embodiment has a system for controlling the detector 30 based on the signal supplied from the driving unit 40, and a system for controlling the detector 30 based on the signal from the sampling signal generating unit 42. By switching these two systems as appropriate at the switching unit 44, the small measuring apparatus 26 of the present embodiment can serve not only as a common surface texture measuring apparatus, but also as a microvibrograph combined with another surface texture measuring apparatus, contributing to improvement in measurement accuracy.

Figure 3:
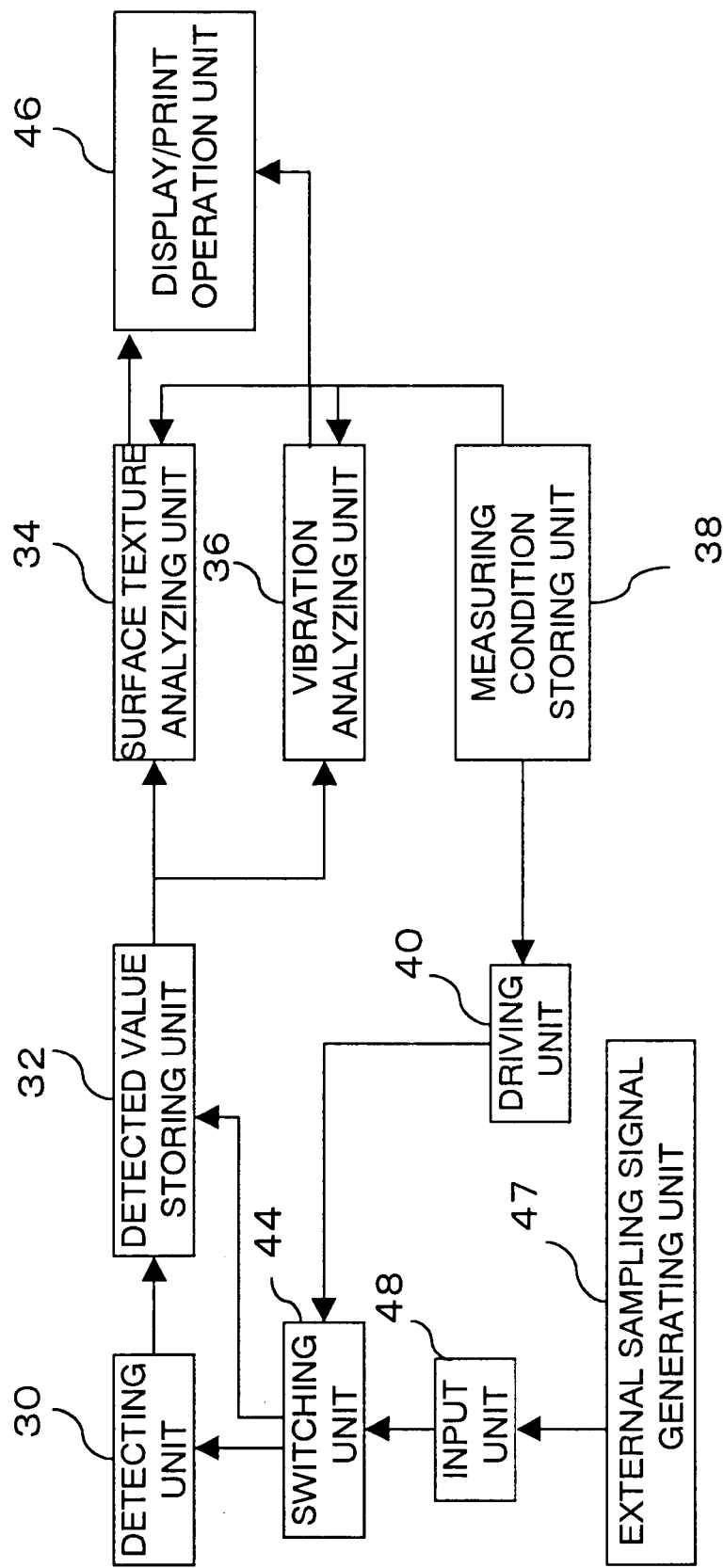
FIG. 3 is a block diagram illustrating another configuration of the small measuring apparatus shown in FIG. 1.

FIG. 3 is a block diagram showing another configuration of the small measuring apparatus 26 shown in FIG. 1. The configuration shown in FIG. 3 differs from that in FIG. 2 in that the sampling signal generating unit 42 is replaced by an input unit 48 for providing a signal received from an external sampling signal generating unit 47 to the switching unit 44.

The external sampling signal generating unit 47 provides a timing signal for sampling displacement in the Z axis direction, as does the sampling signal generating unit 42, and preferably shares the sampling timing with the main measuring apparatus. More specifically, the driving unit in the main measuring apparatus is used as the external sampling signal generating unit 47, and a signal from the driving unit is used as a sampling signal, not as a driving signal. As a result, vibration measurement and texture measurement at the main measuring apparatus can be conducted in a complete synchronization, ensuring removal of vibration components and therefore achieving a highly accurate measurement.

While the amount of vibration detected by the vibration analyzing unit 36 is supplied to the main measuring apparatus and removed from the detected unevenness value in this embodiment, the amount of vibration and the unevenness value can be separately output and compared, or the output amount of vibration can be compared with a threshold and an alarm can be given when it exceeds the threshold.

In addition, although the small measuring apparatus is used as a microvibrograph in this embodiment, a dedicated microvibrograph can be installed in the main measuring apparatus to detect the amount of vibration. Such a dedicated microvibrograph may include a stylus, a detection unit for bringing the stylus into contact with a surface of a workpiece to detect displacement in the Z axis direction as vibration, and a unit for outputting the detected vibration.

Alternatively, the main measuring apparatus may be used as a vibrograph in the present embodiment without using the small measuring apparatus or the dedicated microvibrograph. More specifically, according to this option, the detecting device 16 is not driven in the X axis direction, and the stylus is stopped on the workpiece before conducting measurement. In this state, displacement of the stylus in the Z axis direction is detected to obtain the amount of vibration, and then the detecting device 16 is moved in the X axis direction to detect unevenness. Alternatively, the detecting device 16 may be stopped to detect the amount of vibration after unevenness is detected. Further, the detecting device 16 may alternatively be regularly stopped to detect the amount of vibration while measuring unevenness. In other words, the stylus is stopped at least once during the measurement period to detect the amount of vibration, based on which the amount of unevenness is corrected. Switching of the moving state and the stopped state may be programmed by a user.

Further, although a highly accurate measurement of surface texture can be achieved taking vibration into consideration according to the present embodiment, another (a third) surface texture measuring apparatus may be used that receives displacement data in the Z axis direction and vibration data to perform the analysis if performance of the surface texture analyzing unit of the main measuring apparatus is not satisfactory.

A wide variety of surface texture measuring apparatuses are available. Some are relatively compact and portable, while others are installed in a measurement room to which a workpiece is brought in for measurement. When portable apparatuses are used for both the main measuring apparatus and the small measuring apparatus 26 shown in FIG. 1, their performance may not reach a satisfactory level. In such a case, therefore, measurement data is preferably output for processing to a measuring apparatus of the type installed in a measurement room and having sufficient analyzing functions as described above.

Figure 4:
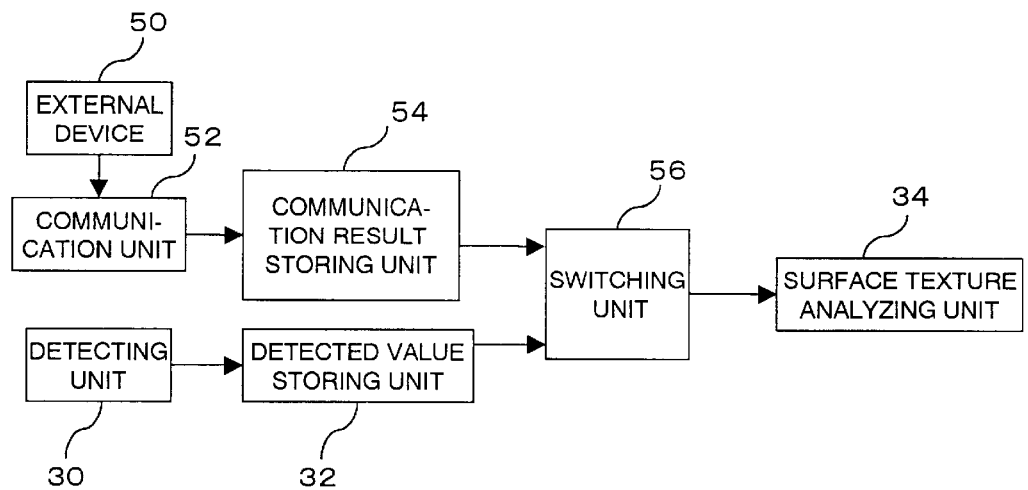
FIG. 4 is a block diagram illustrating a configuration of a third measuring apparatus according to an embodiment of the present invention.

FIG. 4 is a block diagram showing a configuration of main components of such a third surface texture measurement apparatus. This apparatus includes a communication unit 52 (RS 232 standard, GP-IB, Centronics specification) for receiving measurement data applied from an external device 50, such as the main measuring apparatus of FIG. 1 and a relay computer, a storing unit 54 for storing communication results, a detecting unit 30 serving as a common measuring apparatus, a detected value storing unit 32, a switching unit 56 for switching measurement data from the communication result storing unit 54 and the detected value from the detected value storing unit 32, and a surface texture analyzing unit 34. The measurement data applied from the main measuring apparatus shown in FIG. 1 is supplied through the switching unit 56 to the surface texture analyzing unit 34, where roughness and winding that cannot be calculated at the main measuring apparatus are evaluated and output. The output result can be displayed or printed by a display/printing device (not shown). Alternatively, the output result can be fed back to the external device 50 through the communication unit 52, and displayed at the display device of the external device 50 (more specifically, the display device 22 of the main measuring apparatus).

Figure 5:
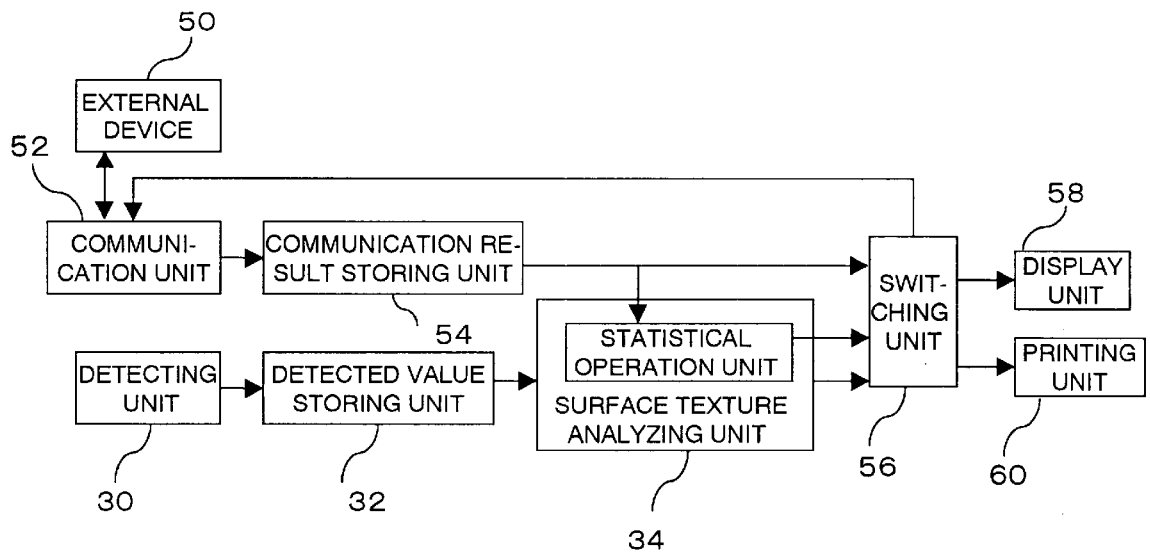
FIG. 5 is a block diagram illustrating another configuration of the third measuring apparatus according to an embodiment of the present invention.

FIG. 5 is a block diagram showing another configuration of the third surface texture measuring apparatus. In this example, only a portion of the analyzing unit 34 in the third surface texture measuring apparatus having a certain function, such as a statistical operation unit, is used for data processing, and then outputs the data to a display unit 58 or a printing unit 60. The data may also be output to the display unit 58 or the printing unit 60 directly from the switching unit 56, without going through the analyzing unit 34.

Some of the recently available hand tools, such as vernier calipers and micrometers, are provided with a function for outputting measurement data, which is printed by a dedicated printer or provided to a statistically processing operation device connected thereto for statistical operations, and used for controlling process quality. In this particular example, the measurement data supplied from the external device 50 can be directly displayed or printed, or only particular operational processing can be executed, and therefore, measurement results obtained with such a hand tool can be processed in addition to the surface texture measurement data. Thus, process quality can be controlled by utilizing the third surface texture measuring apparatus to output measurement result, perform statistical operations, and the like, without requiring a dedicated printer or a statistical processing operation device.

It is also possible to provide measurement data for processing from the main measuring apparatus shown in FIG. 1 to a computer having a sufficiently high operation speed and operation processing program, rather than to the third surface texture measuring apparatus. However, it is more efficient to use the third surface texture measuring apparatus as described above because calculation of surface texture is relatively complicated and developing such a program requires a relatively long time.

What is claimed is:

1. A surface texture measuring apparatus for moving a first stylus in a first axis direction along a workpiece to detect displacement of said first stylus in a second axis direction perpendicular to said first axis direction resulting from texture of a surface of said workpiece, comprising:

detection means for detecting vibration of said workpiece, said detection means comprising a second stylus;

output means for outputting detected vibration in association with movement of said first stylus in said first axis direction.

2. The surface texture measuring apparatus according to claim 1, further comprising correction means for correcting the displacement of said first stylus in said second axis direction using said vibration output from said output means.

3. The surface texture measuring apparatus according to claim 1, said detection means including:

means for bringing said second stylus into contact with the surface of said workpiece, and detecting displacement of said second stylus in said second axis direction at a contact position as said vibration.

4. The surface texture measuring apparatus according to claim 1, said detection means being a second surface texture measuring apparatus supporting said second stylus, wherein said second surface texture measuring apparatus does not move along said workpiece, but detects displacement of said second stylus in said second axis direction as said vibration.

5. The surface texture measuring apparatus according to claim 3, said detection means further including means for outputting a signal synchronized with a timing for detecting the displacement of said first stylus in said second axis direction, wherein said means for detecting the vibration detects said vibration using said synchronized signal as a sampling signal.

6. The surface texture measuring apparatus according to claim 4, said second surface texture measuring apparatus including:

means for receiving a signal synchronized with a timing for detecting the displacement of said first stylus in said second axis direction; and means for detecting said vibration by using said synchronized signal as a sampling signal.

7. A surface texture measuring apparatus for moving a stylus in a first axis direction along a workpiece to detect displacement of said stylus in a second axis direction perpendicular to said first axis direction resulting from texture of a surface of said workpiece, comprising:

means for detecting displacement of said stylus in a second axis direction while moving a stylus in a first axis direction, wherein said displacement is representative of the surface variation of a workpiece; and means for stopping said stylus at the surface of said workpiece;

means for detecting the displacement of said stylus in said second axis direction in a stopped state as vibration of said workpiece affecting the measured displacement of said stylus in said second axis direction while said stylus moves in said first axis direction; and means for outputting said vibration and displacement in a moving state.

8. The surface texture measuring apparatus according to claim 7, further comprising means for correcting the displacement in said moving state by using said vibration.

9. A surface texture measuring apparatus for moving a stylus in a first axis direction along a workpiece to detect displacement of said stylus in a second axis direction perpendicular to said first axis direction resulting from texture of a surface of said workpiece, comprising:

means for switching states where in a first state said stylus is moving in said first axis direction and in a second state said stylus is stationary with respect to said first axis direction;

means for detecting vibration displacement by detecting displacement of said stylus in said second axis direction in said second state;

means for detecting workpiece surface variation by detecting the displacement of said stylus in said second axis direction in said first state; and means for outputting the two displacements.

10. The surface texture measuring apparatus according to claim 9, further comprising means for calculating surface texture of said workpiece based on said two displacements.

* * * * *